US012801558B2

(12) United States Patent
Varadharajan et al.

(10) Patent No.: US 12,801,558 B2
(45) Date of Patent: Nov. 17, 2026

(54) SYSTEM AND METHODS FOR PCIE MULTIHOST COMMUNICATION

(71) Applicant: Microchip Technology Inc., Chandler, AZ (US)

(72) Inventors: Prasanna Vengateshan Varadharajan, Chennai (IN); Rakesh Sankaranarayanan, Chennai (IN); Pragash Mangalapandian, Chennai (IN); Atish Ghosh, Austin, TX (US)

(73) Assignee: Microchip Technology Inc., Chandler, AZ (US)

( * ) Notice: Subject to any disclaimer, the term of this patent is extended or adjusted under 35 U.S.C. 154(b) by 8 days.

(21) Appl. No.: 19/199,979

(22) Filed: May 6, 2025

(65) Prior Publication Data

US 2026/0037471 A1 Feb. 5, 2026

(30) Foreign Application Priority Data

Aug. 1, 2024 (IN) ............................ 202411058534

(51) Int. Cl.
*G06F 13/42* (2006.01)
*G06F 13/40* (2006.01)

(52) U.S. Cl.
CPC ...... *G06F 13/4221* (2013.01); *G06F 13/4022* (2013.01); *G06F 2213/0026* (2013.01)

(58) Field of Classification Search
CPC ......... G06F 2213/0026; G06F 13/4022; G06F 13/4221
See application file for complete search history.

(56) References Cited

U.S. PATENT DOCUMENTS

| | | | | |
|---|---|---|---|---|
| 7,480,303 | B1 | 1/2009 | Ngai | 370/395.5 |
| 10,983,930 | B1 * | 4/2021 | Ravich | G06F 13/4282 |
| 2002/0009079 | A1 | 1/2002 | Jungck et al. | 370/389 |
| 2007/0159960 | A1 * | 7/2007 | Schimke | H04L 12/40<br>370/242 |
| 2014/0181354 | A1 | 6/2014 | Yi et al. | 710/313 |
| 2017/0046295 | A1 * | 2/2017 | Schwemmer | G06F 13/4022 |
| 2017/0147456 | A1 * | 5/2017 | Lee | G06F 11/2033 |
| 2019/0199544 | A1 | 6/2019 | Wang et al. | |

(Continued)

FOREIGN PATENT DOCUMENTS

EP 2863595 B1 1/2018 ............. H04L 45/02

OTHER PUBLICATIONS

International Search Report and Written Opinion, Application No. PCT/US2025/037634, 13 pages, Oct. 17, 2025.

*Primary Examiner* — Phong H Dang
(74) *Attorney, Agent, or Firm* — Slayden Grubert Beard PLLC

(57) ABSTRACT

A system includes a PCIe switch coupled to one or more hosts and coupled to at least one PCIe switch. A data packet may be received at the PCIe switch, the data packet to be moved from a source host to a destination host. Address information may be extracted from the data packet and may be compared with address information mapped to respective hosts in a routing table. The PCIe switch retrieves the destination buffer address from the destination host, communicate the destination address to the source host, program a bridge circuit to enable direct access of destination buffer to the source host allowing data to be bridged between the source host and the destination host.

20 Claims, 2 Drawing Sheets

(56) References Cited

U.S. PATENT DOCUMENTS

| | | | | |
|---|---|---|---|---|
| 2021/0374086 | A1* | 12/2021 | Jose | G06F 13/4221 |
| 2022/0342838 | A1* | 10/2022 | Kunz | G06F 13/28 |
| 2023/0385154 | A1 | 11/2023 | Karr | |

* cited by examiner

SYSTEM AND METHODS FOR PCIE MULTIHOST COMMUNICATION

PRIORITY

This application claims priority to commonly owned Indian Provisional Patent Application No. 202411058534 filed on Aug. 1, 2024, the entire contents of which are hereby incorporated by reference for all purposes.

FIELD OF THE INVENTION

The present disclosure relates to a device, system and method for communication between Peripheral Component Interconnect Express (PCIe) hosts.

BACKGROUND

In PCIe systems, hosts may need to communicate with other hosts. Existing solutions may utilize Ethernet sockets for communication between PCIe hosts, which may include Ethernet controllers in the PCIe switch. Such existing solutions may include a driver in each host to emulate a virtual Network Interface Card (NIC) and enables non-transparent bridging (NTB).

Such solutions may include synchronization between multiple hosts which may increase the complexity of the solution and may result in increased memory requirements and increased computational resources.

There is a need for device, systems and methods to enable communication between PCIe hosts that does not include Ethernet controllers in the PCIe switch or additional NIC emulating host software to support host drivers.

SUMMARY

The examples herein enable a device, system and method for communication between hosts via a PCIe switch.

According to one aspect, a device includes a Peripheral Component Interconnect Express (PCIe) switch coupled to a plurality of hosts. The PCIe switch includes a plurality of partitions, the partitions including a Logical Ethernet adapter (LEA) and at least one upstream port. The PCIe switch includes a network administrator coupled to the plurality of partitions, and a bridge circuit. The PCIe switch creates a routing table comprising addresses mapped to respective hosts. The PCIe switch receives a data packet from a source host in the plurality of hosts at a respective upstream port, and the PCIe switch identifies a destination host in the plurality of hosts from the data packet based on address information extracted from the received data packet. The network administrator retrieves a destination buffer address from the destination host and communicates the destination buffer address to the source host. The PCIe switch configures a rules table in the bridge circuit. The PCIe switch fetches a transfer descriptor from the source host including information related to transfer of data to the destination buffer address. The PCIe switch initiates movement of data from the source host to the destination host. The network administrator and bridge circuit move the data packet from the source host to the destination host.

According to one aspect, a system includes a plurality of hosts, the hosts including a logical ethernet adapter driver software, the logical ethernet adapter driver software to transmit and receive data packets across a plurality of hosts. A PCIe switch is coupled to the plurality of hosts. The PCIe switch includes a processor and a plurality of partitions. Respective partitions include a logical Ethernet adapter and at least one upstream port, the upstream port to receive the data packet from a source host. The PCIe switch includes a network administrator including instructions on a non-transitory machine-readable medium, the instructions, when read and executed by the processor, cause the processor to: identify a destination based on an address information in the received data packet, retrieve a destination buffer address from the destination, communicate the destination buffer address to the source host, configure rules to instruct a Non-Transparent Bridging (NTB)/Direct Memory Access (DMA) circuit to move the received data packet to the destination and to issue an interrupt to the destination, fetch a transfer descriptor from the source host comprising the information related to transfer of data to the destination buffer address and to initiate movement of data from the source host to a destination host, the NTB/DMA circuit to move the received data packet from the source host in the plurality of hosts and to the destination host in the plurality of hosts.

According to one aspect, a method includes steps of: creating, at a PCIe switch, a routing table mapping addresses to respective hosts, receiving, at the PCIe switch, a data packet from a source host, extracting, in the PCIe switch, address information from the received data packet, comparing the address information in the received data packet against information in the routing table, the comparison to identify a destination host, retrieving, by a network administrator in the PCIe switch, a destination buffer address from the destination host, communicating, by the network administrator, the destination buffer address to the source host, configuring, at the PCIe switch, a rules table in a bridge circuit, fetching, at the PCIe switch, a transfer descriptor from the source host comprising the information related to transfer of data to the destination buffer address and the PCIe switch to initiate movement of data from the source host to the destination host, and moving one or more data packets from the source host to the destination host, the one or more data packets moved by the network administrator and the bridge circuit.

DETAILED DESCRIPTION

Figure 1:
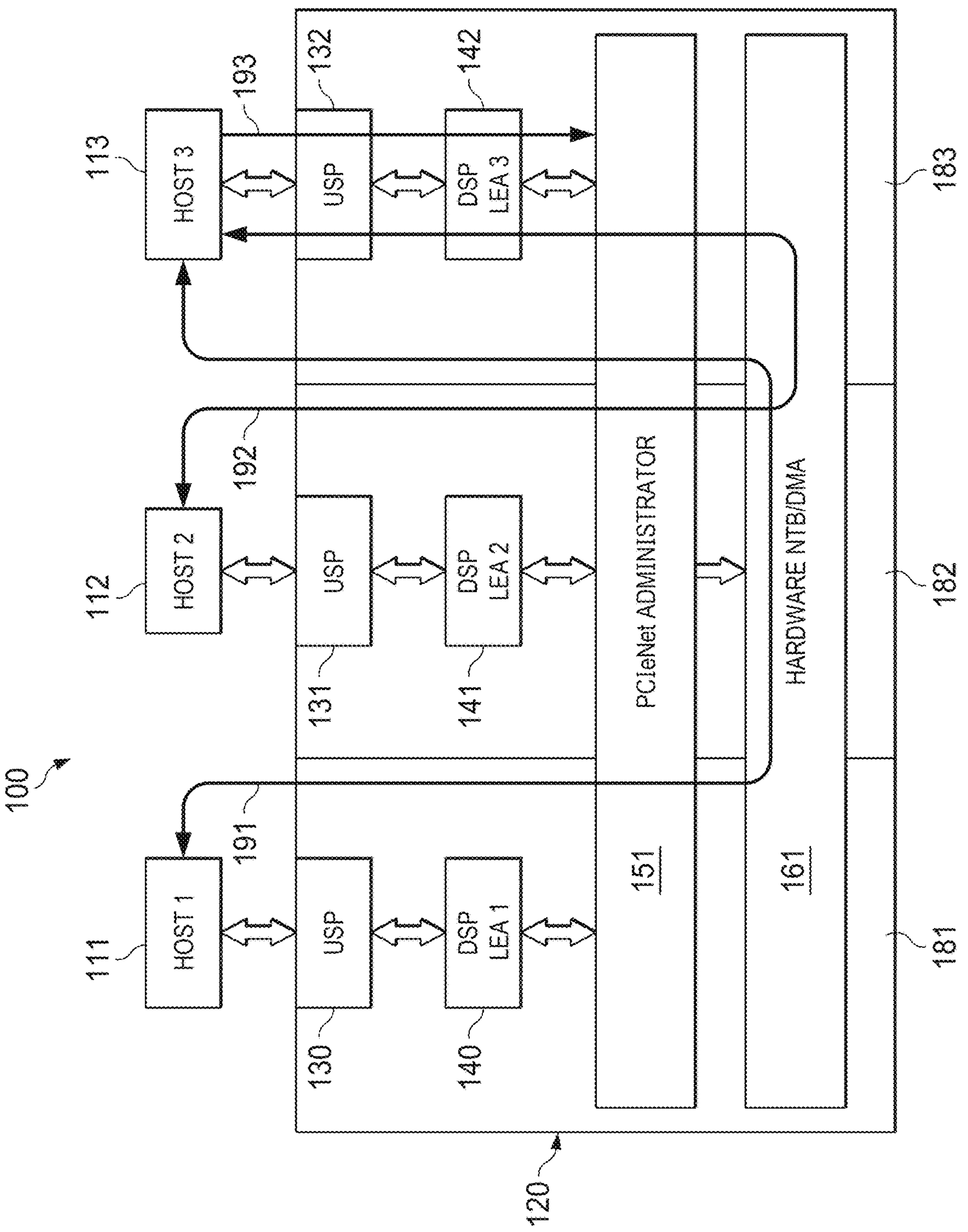
FIG. 1 illustrates one of various examples of a system for multi-host communication between PCIe hosts.

FIG. 1 illustrates one of various examples of a system for multi-host communication between PCIe hosts.

System 100 may include a first host 111, a second host 112 and a third host 113. The example of FIG. 1 includes three hosts, but this is not intended to be limiting.

First host 111 may comprise a processor, a central processing unit (CPU), a microcontroller, or another type of processing device not specifically mentioned. Second host 112 may comprise a processor, a central processing unit (CPU), a microcontroller, or another type of processing device not specifically mentioned. Third host 113 may comprise a processor, a central processing unit (CPU), a microcontroller, or another type of processing device not specifically mentioned.

First host 111 may be coupled to PCIe switch 120 at first upstream port 130. First host 111 and PCIe switch 120 may communicate utilizing the PCIe communication protocol.

Second host 112 may be coupled to PCIe switch 120 at second upstream port 131. Second host 112 and PCIe switch 120 may communicate utilizing the PCIe communication protocol. Third host 113 may be coupled to PCIe switch 120 at third upstream port 132. Third host 113 and PCIe switch 120 may communicate utilizing the PCIe communication protocol. PCIe switch 120 may be a virtual Ethernet endpoint.

In one of various examples, first host 111 may include a Logical Ethernet Adapter (LEA) and LEA driver software. The LEA driver software may transmit and receive data packets across a plurality of hosts. In one of various examples, second host 112 may include a LEA driver software. The LEA driver software may transmit and receive data packets across a plurality of hosts. In one of various examples, third host 113 may include a LEA driver software. The LEA driver software may transmit and receive data packets across a plurality of hosts.

First host 111 may include a host buffer, the host buffer to store transactions, to send transactions to PCIe switch 120 and to receive transactions from PCIe switch 120. Second host 112 may include a host buffer, the host buffer to store transactions, to send transactions to PCIe switch 120, and to receive transactions from PCIe switch 120. Third host 113 may include a host buffer, the host buffer to store transactions, to send transactions to PCIe switch 120 and to receive transactions from PCIe switch 120.

PCIe switch 120 may be configured to include multiple partitions. In the example illustrated in FIG. 1, PCIe switch 120 includes three partitions, but this is not intended to be limiting.

First partition 181 may include first upstream port 130. First upstream port 130 may communicate with first host 111. First partition 181 may include first LEA 140 emulating a virtual NIC. First LEA 140 may be coupled as a downstream port to first upstream port 130 as illustrated in FIG. 1. First LEA 140 may be configured and controlled by an LEA device driver in first host 111. First partition 181 may be coupled to PCIeNet Administrator 151 and NTB/Direct Memory Access (DMA) circuit 161. PCIeNet Administrator 151 may also be termed a network administrator. The network administrator may be a hardware implementation or a software implementation. The network administrator may include a processor, and the network administrator may include a memory comprising instructions on a non-transitory machine-readable medium, the instructions, when read and executed by the processor, to cause the processor to process one or more data packets. NTB/DMA circuit 161 may also be termed a bridge circuit. The bridge circuit may be a hardware implementation or a software implementation or a combination of both. PCIe switch 120 may comprise a host driver.

Second partition 182 may include second upstream port 131. Second upstream port 131 may communicate with second host 112. Second partition 182 may include second LEA 141 emulating a virtual NIC. Second LEA 141 may be coupled as a downstream port to second upstream port 131 as illustrated in FIG. 1. Second LEA 141 may be configured and controlled by the LEA device driver in second host 112. Second partition 182 may be coupled to PCIeNet Administrator 151 and NTB/DMA circuit 161.

Third partition 183 may include third upstream port 132. Third upstream port 132 may communicate with third host 113. Third partition 183 may include third LEA 142 emulating a virtual NIC. Third LEA 142 may be coupled as a downstream port to third upstream port 132 as illustrated in FIG. 1. Third LEA 142 may be configured and controlled by the LEA device driver in third host 113. Third partition 183 may be coupled to PCIeNet Administrator 151 and NTB/DMA circuit 161.

First host 111 may include a destination buffer, the destination buffer accessible via a destination buffer address. Second host 112 may include a destination buffer, the destination buffer accessible via a destination buffer address. Third host 113 may include a destination buffer, the destination buffer accessible via a destination buffer address.

The network administrator may communicate a destination buffer address to a source host via one or more PCIe transactions and messages to a destination host. The network administrator may query the destination host and may receive the destination buffer address from the destination host via one or more PCIe transactions and messages.

The example illustrated in FIG. 1 includes three hosts, three upstream ports, and three LEAs, but this is not intended to be limiting. Other examples may include a different number of hosts, upstream ports and LEAs.

In operation, a data packet may be received at PCIe switch 120 from first host 111. First LEA 140 may identify an Internet Protocol (IP) address in the received data packet. PCIe switch 120 may contain a routing table, and the data packet received from first host 111 may contain a header with address information (e.g., an IP address) indicating the destination of the data packet. Address information may be, without limitation, an IP address. Address information in the header may be compared against information in the routing table to determine information about the destination of the data packet. The routing table may map address information to at least one of first host 111, second host 112 and third host 113. The routing table may map data from a source host to a destination host.

In one of various examples, the header may contain address information indicating the destination of the data packet is third host 113. LEA driver in first host 111 may retrieve a memory address of the data buffer in the third host 113 from the PCIeNet Administrator 151. NTB/DMA circuit 161 may be configured using a rules table to control data movement between first host 111 and third host 113, as indicated by data flow path 191. Rules in the rules table may configure NTB/DMA circuit 161 to move data between first host 111, second host 112 and third host 113. First host 111 may create a transfer descriptor comprising information related to the transfer of data to the destination buffer address in third host 113 and may communicate the network Administrator of the transfer descriptor through a messaging mechanism. PCIeNet Administrator 151 may fetch the transfer descriptor from first host 111 and initiate the movement of data from first host 111 to third host 113. Once data movement is completed from first host 111 to third host 113, PCIeNet Administrator 151 may communicate the completion of data movement to LEA device driver in first host 111 and third host 113 through a messaging mechanism. By utilizing PCIeNet Administrator 151 and NTB/DMA circuit 161, latency may be reduced.

In operation, a data packet may be received at PCIe switch 120 from second host 112. Second LEA 141 may identify an Internet Protocol (IP) address in the received data packet. PCIe switch 120 may contain a routing table, and the data packet received from second host 112 may contain a header with address information (e.g., an IP address) indicating the destination of the data packet. Address information may be, without limitation, an IP address. Address information in the header may be compared against information in the routing table to determine information about the destination of the data packet. In one of various examples, the header may contain address information indicating the destination of the data packet is third host 113. LEA driver in second host 112 may retrieve a memory address of the data buffer in the third host 113 from the PCIeNet Administrator 151. NTB/DMA circuit 161 may be configured using rules table to control data movement between second host 112 and third host 113, as indicated by data flow path 192. Second host 112 may create a transfer descriptor comprising information related to the transfer of data to the destination buffer address in third host 113 and may communicate the network Administrator of the transfer descriptor through a messaging mechanism. PCIeNet Administrator 151 may fetch the transfer descriptor from second host 112 and initiate the movement of data from second host 112 to third host 113. Once data movement is completed from second host 112 to third host 113, PCIeNet Administrator 151 may communicate the completion of data movement to LEA device driver in second host 112 and third host 113 through a messaging mechanism. By utilizing PCIeNet Administrator 151 and NTB/DMA circuit 161, latency may be reduced.

In operation, the rules table may be implemented in hardware or software or a combination of hardware and software. In operation, rules in the rules table control the movement of data across partitions in the PCIe switch 120. In operation, rules in the rule table may be configured, enabled or disabled by software. A host may function as a source of a data packet and may be termed a source host. A host may function as a destination for a data packet and may be termed a destination host.

The example data flow path 191 illustrated in FIG. 1 includes data received at first host 111 and moved to third host 113, but this is not intended to be limiting. The example data flow path 192 illustrated in FIG. 1 includes data received at second host 112 and moved to third host 113, but this is not intended to be limiting.

Figure 2:
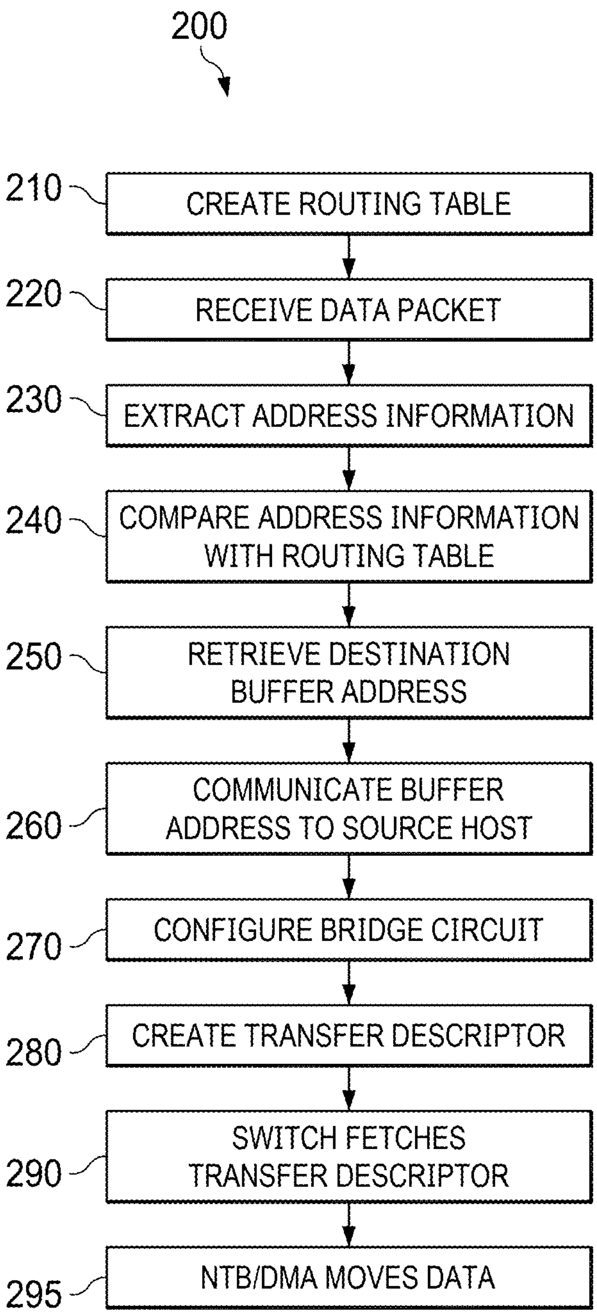
FIG. 2 illustrates a method of multi-host communication between PCIe hosts.

FIG. 2 illustrates a method of multi-host communication between PCIe hosts. A system 100 as described and illustrated in reference to FIG. 1 may utilize the method of FIG. 2 and a PCIe switch may control communication between multiple hosts.

At operation 210, a routing table mapping addresses to respective hosts may be created at a PCIe switch. The routing table may specify mapping addresses between one or more hosts coupled to the PCIe switch. Addresses may be mapped from one or more source hosts to one or more destination hosts.

At operation 220, a data packet may be received at the PCIe switch from a source host.

At operation 230, the PCIe switch may extract address information from the received data packet. The extracted address information may include an IP address or may include a memory location or may include other address information not specifically mentioned.

At operation 240, address information from the received data packet may be compared against the entries in the routing table. The address information extracted from the received data packet may identify a destination host based on entries in the routing table.

At operation 250, a network administrator at the PCIe switch may retrieve a destination buffer address from a destination host.

At operation 260, the network administrator may communicate the destination buffer address to the source host.

At operation 270, a bridge circuit at the PCIe switch may be configured through a rules table. The rules table may specify rules for communication of data between one or more partitions in the PCIe switch.

At operation 280, the source host creates a transfer descriptor. The transfer descriptor may include information related to the transfer of data to the destination buffer address and communicates the network Administrator of the transfer descriptor through a messaging mechanism.

At operation 290, the PCIe switch fetches the transfer descriptor from the source host and initiate the movement of data from the source host to the destination host.

At operation 295, the network Administrator and an NTB/DMA circuit may move the received data packet from the source host to the destination buffer address in the destination host.

The invention claimed is:

1. A device comprising:

a Peripheral Component Interconnect Express (PCIe) switch coupled to a plurality of hosts, the PCIe switch comprising:

a plurality of partitions, respective partitions comprising a Logical Ethernet adapter (LEA) and at least one upstream port;

a network administrator coupled to the plurality of partitions, and a bridge circuit;

wherein the PCIe switch is to create a routing table comprising addresses mapped to respective hosts, and wherein the PCIe switch is to receive a data packet from a source host in the plurality of hosts at a respective upstream port, and wherein the PCIe switch is to identify a destination host in the plurality of hosts from the received data packet based on address information extracted from the received data packet, and wherein the network administrator is to retrieve a destination buffer address from the destination host and is to communicate the destination buffer address to the source host, and wherein the PCIe switch is to configure a rules table in the bridge circuit, and wherein the PCIe switch is to fetch a transfer descriptor from the source host comprising information related to transfer of data to the destination buffer address and the PCIe switch is to initiate movement of data from the source host to the destination host, and wherein the network administrator and bridge circuit are to move the data packet from the source host to the destination host.

2. The device as claimed in claim 1, wherein the routing table comprises a linked list of source addresses and destination addresses.

3. The device as claimed in claim 1, wherein the destination host is to be identified by comparing the address information in the received data packet with entries in the routing table.

4. The device as claimed in claim 1, wherein the destination buffer address is to be queried by the network administrator from the destination host through one or more PCIe transactions and messages to the destination host.

5. The device as claimed in claim 1, the destination buffer address is to be communicated by the network administrator to the source host through one or more PCIe transactions and messages to the source host.

6. The device as claimed in claim 1, wherein the PCIe switch comprises a virtual Ethernet endpoint.

7. The device as claimed in claim 1, wherein the address information comprises an IP address.

8. The device as claimed in claim 1, the rules table comprising a list of rules enabling data transfer across partitions of the PCIe switch.

9. A system comprising:

a plurality of hosts, respective hosts comprising a logical ethernet adapter driver software, the logical ethernet adapter driver software to transmit and receive data packets across a plurality of hosts;

a PCIe switch coupled to the plurality of hosts, the PCIe switch comprising:

a processor, a plurality of partitions, respective partitions comprising a logical Ethernet adapter and at least one upstream port, the upstream port to receive the data packet from a source host; and a network administrator comprising instructions on a non-transitory machine-readable medium, the instructions, when read and executed by the processor, to cause the processor to: identify a destination based on an address information in the received data packet, retrieve a destination buffer address from the destination, communicate the destination buffer address to the source host, configure rules to instruct a Non-Transparent Bridging (NTB)/Direct Memory Access (DMA) circuit to move the received data packet to the destination and to issue an interrupt to the destination, fetch a transfer descriptor from the source host comprising the information related to transfer of data to the destination buffer address and to initiate movement of data from the source host to a destination host, the NTB/DMA circuit to move the received data packet from the source host in the plurality of hosts and to the destination host in the plurality of hosts.

10. The system as claimed in claim 9, wherein the routing table comprises a linked list of source addresses and destination addresses.

11. The system as claimed in claim 9, the PCIe switch comprising a host driver, the host driver comprising a logical Ethernet adapter driver.

12. The system as claimed in claim 9, wherein the address information comprises an IP address.

13. The system as claimed in claim 9, respective hosts of the plurality of hosts comprising a host buffer, the host buffer to be accessed by the PCIe switch.

14. The system as claimed in claim 9, the rules table comprising a list of rules enabling data transfer across partitions of the PCIe switch.

15. A method comprising:

creating, at a PCIe switch, a routing table mapping addresses to respective hosts;

receiving, at the PCIe switch, a data packet from a source host;

extracting, in the PCIe switch, address information from the received data packet;

comparing the address information in the received data packet against information in the routing table, the comparison to identify a destination host;

retrieving, by a network administrator in the PCIe switch, a destination buffer address from the destination host;

communicating, by the network administrator, the destination buffer address to the source host;

configuring, at the PCIe switch, a rules table in a bridge circuit;

creating a transfer descriptor comprising information related to transfer of data to the destination buffer address;

fetching, at the PCIe switch, the transfer descriptor from the source host and the PCIe switch to initiate movement of data from the source host to the destination host; and moving one or more data packets from the source host to the destination host, the one or more data packets moved by the network administrator and the bridge circuit.

16. The method as claimed in claim 15, wherein the routing table comprises a linked list of source addresses and destination addresses.

17. The method as claimed in claim 15, the method comprising configuring the PCIe switch to include a plurality of partitions.

18. The method as claimed in claim 15, the routing table comprising a list of addresses mapped to respective hosts from the list of plurality of hosts.

19. The method as claimed in claim 15, the rules table comprising a list of rules enabling data transfer across partitions of the PCIe switch.

20. The method as claimed in claim 15, wherein the address information comprises an IP address.

* * * * *